US012525727B2

United States Patent

(12) United States Patent
Kim et al.

(10) Patent No.: US 12,525,727 B2
(45) Date of Patent: Jan. 13, 2026

(54) QUAD-POLARIZED ANTENNA ARRAY AND SPATIAL POLARIZATION SEPARATION USING THE SAME

(71) Applicant: KMW INC., Hwaseong-si (KR)

(72) Inventors: Duk Yong Kim, Yongin-si (KR); Sung Hwan So, Hwaseong-si (KR); Oh Seog Choi, Hwaseong-si (KR); Seong Man Kang, Hwaseong-si (KR); Hyoung Seok Yang, Hwaseong-si (KR); Yong Won Seo, Hwaseong-si (KR); Myung Hwa Kim, Hwaseong-si (KR); Yeong Min Lee, Osan-si (KR); Kyo Sung Ji, Osan-si (KR); Chi Back Ryu, Hwaseong-si (KR)

(73) Assignee: KMW INC., Hwaseong-si (KR)

( * ) Notice: Subject to any disclaimer, the term of this patent is extended or adjusted under 35 U.S.C. 154(b) by 162 days.

(21) Appl. No.: 18/372,141

(22) Filed: Sep. 25, 2023

(65) Prior Publication Data

US 2024/0014573 A1 Jan. 11, 2024

Related U.S. Application Data

(63) Continuation of application No. PCT/KR2022/004213, filed on Mar. 25, 2022.

(30) Foreign Application Priority Data

Mar. 26, 2021 (KR) ........................ 10-2021-0039618
Mar. 24, 2022 (KR) ........................ 10-2022-0036777

(51) Int. Cl.
*H01Q 21/24* (2006.01)

(52) U.S. Cl.
CPC .................................. *H01Q 21/24* (2013.01)

(58) Field of Classification Search
CPC .......... H01Q 21/24; H01Q 21/26; H04B 7/06; H04B 7/10; H05B 3/44
See application file for complete search history.

(56) References Cited

U.S. PATENT DOCUMENTS 9,537,204 B2 1/2017 Cheng et al.
2008/0129634 A1 6/2008 Pera et al.
(Continued)

FOREIGN PATENT DOCUMENTS

CN 1599138 A 3/2005
CN 102800996 A 11/2012
(Continued)

OTHER PUBLICATIONS

International Search Report mailed Jun. 27, 2022 for International Application No. PCT/KR2022/004213 and its English translation.
(Continued)

*Primary Examiner* — Dieu Hien T Duong
(74) *Attorney, Agent, or Firm* — Insight Law Group, PLLC; Seung Lee

(57) ABSTRACT

A quad-polarized antenna system according to the present invention comprises a plurality of RF chains, and an antenna array in which rows of first dual-polarized antenna units and rows of second dual-polarized antenna units are alternately arranged in a horizontal direction. The first dual-polarized antenna unit and the second dual-polarized antenna unit have different dual polarization characteristics from each other. The rows of first dual-polarized antenna units are used to form at least one first beam and at least one second beam which have +/−45° polarizations, and the rows of second dual-polarized antenna units are used to form at least one third beam and at least one fourth beam which have 0°/90° polarizations. The first beam, the second beam, the third beam, and the fourth beam are formed towards different spatial directions, and the first and third beams correspond (Continued)

to main lobes, and the second and fourth beams correspond to grating lobes.

5 Claims, 8 Drawing Sheets

(56) References Cited

U.S. PATENT DOCUMENTS

| | | | | |
|---|---|---|---|---|
| 2015/0263435 | A1 | 9/2015 | Song et al. | |
| 2016/0149634 | A1 | 5/2016 | Kalkunte et al. | |
| 2023/0006367 | A1* | 1/2023 | Varnoosfaderani | H01Q 21/24 |

FOREIGN PATENT DOCUMENTS

| | | | |
|---|---|---|---|
| EP | 4092832 | A1 | 11/2022 |
| JP | 2017-508402 | A | 3/2017 |
| JP | 2019-012874 | A | 1/2019 |
| KR | 10-2016-0133450 | A | 11/2016 |
| KR | 10-1847133 | B1 | 4/2018 |
| KR | 10-2018-0056781 | A1 | 5/2018 |

OTHER PUBLICATIONS

Non-final Office Action dated Sep. 17, 2024 for Japanese Application No. 2023-558398 and its English trasnlation.

Non-final Office Action mailed May 30, 2023 from the Korean Patent Office for Korean Application No. 10-2022-0036777 and its English translation.

European Search Report mailed on Feb. 18, 2025 from European Patent Office for Application No. 22776143.4.

* cited by examiner

| polarization | Signal |
|---|---|
| +45° | S1 |
| −45° | S2 |
| V | S3 |
| H | S4 |

| polarization | Signal |
|---|---|
| +45° | S1 |
| −45° | S2 |
| V | S3 |
| H | S4 |

| polarization | Signal |
|---|---|
| +45° | S1 |
| −45° | S2 |
| V | S3 |
| H | S4 |

QUAD-POLARIZED ANTENNA ARRAY AND SPATIAL POLARIZATION SEPARATION USING THE SAME

CROSS-REFERENCE TO RELATED APPLICATION

This application is a Continuation of International Application No. PCT/KR2022/004213, filed on Mar. 25, 2022, which claims priority to Patent Application No. 10-2021-0039618 filed in Korea on Mar. 26, 2021, and Patent Application No. 10-2022-0036777 filed in Korea on Mar. 24, 2022, which are incorporated herein by reference in their entirety.

TECHNICAL FIELD

The present disclosure relates to an array antenna system that is capable of improving the orthogonality of radio channels and increasing the channel capacity of the system, by spatially separating beams such that contiguous beams have different dual polarization from each other.

BACKGROUND

The description in this section merely provides background information on the present disclosure and does not necessarily constitute the related art.

The polarization of an antenna refers to the orientation of an electric field (i.e., E-plane) of a radio wave with respect to the Earth's surface and is determined at least partially by the physical structure and orientation of an antenna element. For example, a simple linear antenna element has one polarization when vertically mounted and has another polarization when horizontally mounted. Although the magnetic field of the radio wave is perpendicular to the electric field, it is conventionally understood that the polarization of the antenna element refers to the orientation of the electric field.

In cellular communication, an MIMO (multiple-input and multiple-output) antenna is generally designed as a dual-polarized antenna to reduce a fading effect due to multiple paths fading effect and to support a polarization diversity function. However, in a massive MIMO system using multiple beams, interference between contiguous beams increases the correlation of the radio channels, which makes it difficult to use spatial resources efficiently.

SUMMARY

(a) Technical Problem

The present disclosure presents a configuration of an antenna array suitable for dividing spaces (sectors) through beams having different dual polarizations, and spatial multiplexing of beams using the same.

(b) Technical Solution

A quad-polarized antenna system according to the present invention comprises a plurality of RF chains, and an antenna array in which rows of first dual-polarized antenna units and rows of second dual-polarized antenna units are alternately arranged in a horizontal direction. The first dual-polarized antenna unit and the second dual-polarized antenna unit have different dual polarization characteristics from each other.

The rows of first dual-polarized antenna units are used to form at least one first beam and at least one second beam which have +/−45° polarizations, and the rows of second dual-polarized antenna units are used to form at least one third beam and at least one fourth beam which have 0°/90° polarizations. The first and third beams correspond to main lobes, and the second and fourth beams correspond to grating lobes.

The first beam, the second beam, the third beam, and the fourth beam are formed towards different spatial directions. The first beam and the second beam are not spatially contiguous to each other, and the third beam and the fourth beam are not spatially contiguous to each other. The first beam and the second beam each are formed contiguous to at least one of the third beam and the fourth beam.

The first dual-polarized antenna unit includes a first antenna element and a second antenna element which are perpendicular to each other, and the second dual-polarized antenna unit includes a third antenna element and a fourth antenna element which are perpendicular to each other. The antenna elements of the first dual-polarized antenna unit form an angle of 45 degrees with the third and fourth antenna elements of the second dual-polarized antenna unit.

In each of the rows of first dual-polarized antenna units, the first antenna elements are connected to a feeder line to form a first sub-array, and the second antenna elements are connected to a feeder line to form a second sub-array. In each of the rows of second dual-polarized antenna units, the third antenna elements are connected to a feeder line to form a third sub-array, and the fourth antenna elements are connected to a feeder line to form a fourth sub-array.

A pair of first sub-arrays positioned in different rows are connected to a first RF chain, a pair of second sub-arrays positioned in different rows are connected to a second RF chain, a pair of third sub-arrays positioned in different rows are connected to a third RF chain, and a pair of fourth sub-arrays positioned in different rows are connected to a fourth RF chain. The directions of the first to fourth beams are determined by differences in RF path lengths from the respective pair of subarrays to the corresponding RF chains.

DETAILED DESCRIPTION

Figure 1A:
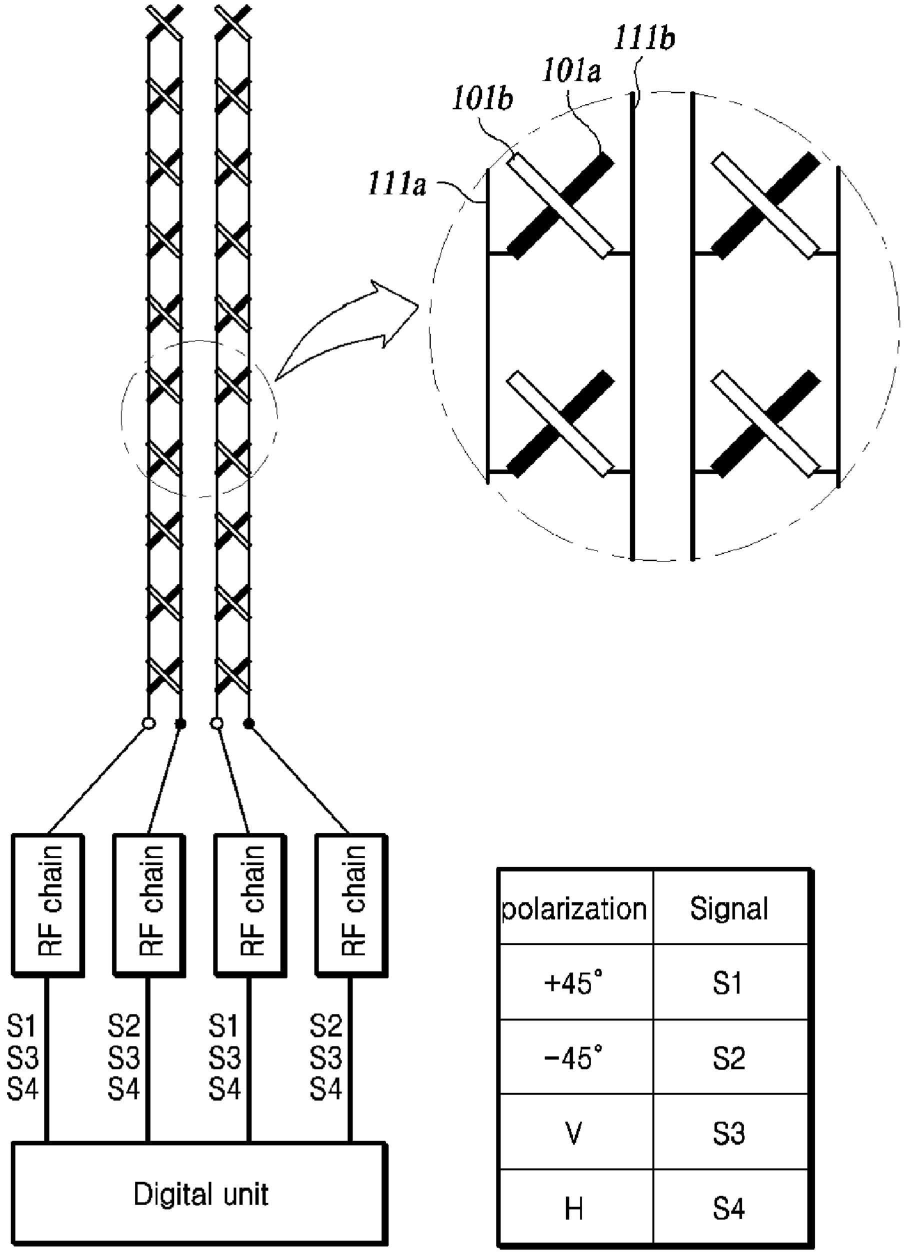
FIG. 1A depicts an example of a 4T4R antenna system using a dual-polarized array.

Hereinafter, some embodiments of the present disclosure will be described in detail with reference to the accompanying drawings. It should be noted that, in adding reference numerals to the constituent elements in the respective drawings, like reference numerals designate like elements, although the elements are shown in different drawings. Further, in the following description of the present disclosure, a detailed description of known functions and configurations incorporated herein will be omitted to avoid obscuring the subject matter of the present disclosure.

The technologies of the present disclosure relate to an antenna array configuration that is useful to achieve spatial polarization separation such that contiguous beams have different dual polarization characteristics from each other.

An antenna array according to the present disclosure includes first dual-polarized antenna units and second dual-polarized antenna units. The first dual-polarized antenna unit and the second dual-polarized antenna unit have different dual polarization characteristics from each other.

The first dual-polarized antenna units are used to form at least one first beam and at least one second beam, and the second dual-polarized antenna units are used to form at least one third beam and at least one fourth beam. The first beam and the third beam correspond to main lobes, and the second beam and the fourth beam correspond to grating lobes. The first beam and the second beam have the same dual polarization characteristics and the third beam and the fourth beam have the same dual polarization characteristics, whereas the first beam and the second beam have different dual polarization characteristics from the third beam and the fourth beam.

The first to fourth beams are formed towards different spatial directions, the first and third beams correspond to main lobes, and the second and fourth beams correspond to grating lobes.

The first beam and the second beam are not spatially contiguous to each other, and the third beam and the fourth beam are not spatially contiguous to each other. On the other hand, the first beam and the second beam each are formed contiguous to at least one of the third beam and the fourth beam. Thus, spatially contiguous beams have different dual polarization characteristics from each other, and this can effectively reduce interference between contiguous beams, as compared to contiguous beams having the same dual polarization characteristics.

For a better understanding of the technical usefulness of the presented technology, it can be helpful to begin with an explanation of solutions that can be considered to form beams having different polarization characteristics, in an antenna system using a dual-polarized array.

Figure 1B:
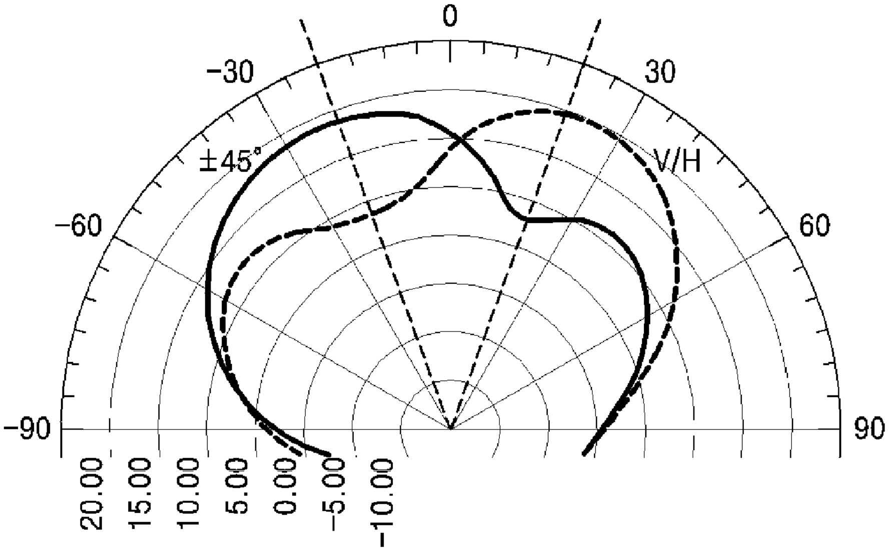
FIG. 1B shows an exemplary spatially multiplexed beam pattern that can be implemented by the antenna system of FIG. 1A.

FIG. 1A depicts an example of a 4T4R antenna system using a dual-polarized array. FIG. 1B shows an exemplary spatially multiplexed beam pattern that can be implemented by the antenna system of FIG. 1A.

The dual-polarized antenna array depicted in FIG. 1A includes two rows of dual-polarized antenna units. Each dual-polarized antenna unit includes a first antenna element 101*a* having +45° polarization and a second antenna element 101*b* having −45° polarization. In each row, the antenna elements are connected to respective feeder lines for each of polarizations. That is, in each row, the first antenna elements 101*a* having +45° polarization are connected to a first feeder line 111*a* to form a first sub array, and the second antenna elements 101*b* having −45° polarization are connected to a second feeder line 111*b* to form a second sub array. Thus, in the dual-polarized antenna array depicted in FIG. 1A, the antenna elements are divided into four sub-arrays. The four sub-arrays are connected to four antenna ports, respectively, through feeder lines. Each RF chain is connected to each antenna port. Each RF chain includes RF elements such as an LNA (low noise amplifier), a PA (power amplifier), a filter, etc., and provides an RF transmission path and an RF reception path. Thus, the antenna system of FIG. 1A is 4T4R.

The spacing between antenna elements having the same polarization characteristics is generally 0.5λ, where λ is the wavelength of a center frequency in a frequency band for an antenna array. The greater the spacing, the better, in order to ensure low correlation. That is, in the depicted figures, the spacing between contiguous rows may be from 0.5λ, to 1λ.

Through polarization composition (or synthesis), and phase adjusting for a desired beam direction performed in a digital domain (e.g., by a digital unit) for signals S1 to S4, two beams having different dual polarization characteristics from each other (i.e., a first beam having +/−45° polarizations and a second beam having V/H polarizations) may be formed in different spatial directions.

In FIG. 1B, a left-upward beam having +/−45° polarizations is formed by providing S1 signals with different phases to a first antenna port and a third antenna port, and providing S2 signals with different phases to a second antenna port and a fourth antenna port. In FIG. 1B, a right-upward beam having V/H polarizations is formed by providing S3 signals with different phases and S4 signals with different phases to first to fourth antenna ports. When S3 signals with different phases are radiated from sub-arrays of an antenna array, 90° (V) polarization is formed as a result of the polarization composition, and when S4 signals with different phases are radiated from subarrays of an antenna array, 0° (H) polarization is formed as a result of the polarization composition. A detailed method of forming beams having +/−45° polarizations and V/H polarizations is disclosed in Korean Patent Application No. 10-2020-0046256 filed on Apr. 16, 2020 by the present applicant.

Referring to FIG. 1B, beams with a beam width of about 40° with respect to a horizontal surface may be formed towards different directions. In particular, contiguous beams have different dual polarization characteristics from each other. In FIG. 1B, ±45° and V/H are denoted to represent dual polarization characteristics of each beam, wherein ±45° represents that the beam has +45° polarization and −45° polarization, and V/H represents that the beam has 90° (V) polarization and 0° (H) polarization. The same applies to the other drawings. For example, a beam formed in a left-upward direction has a radio signal with +45° polarization and a radio signal with −45° polarization, and a beam formed in a right-upward direction has a radio signal with 90° polarization and a radio signal with 0° polarization.

The antenna system of FIG. 1A can increase capacity, as compared to a legacy antenna system which forms four beams (with beam width of 65 degrees) with the same dual polarization characteristics. In a frequency band higher than 3.5 GHz, an internal area of an antenna enclosure is wider compared to an area occupied by dual-polarized antenna units, which is inefficient. Thus, such an antenna array with more sub-arrays as in FIG. 2A may be considered in order to actively utilize the spare area of the enclosure.

Figure 2A:
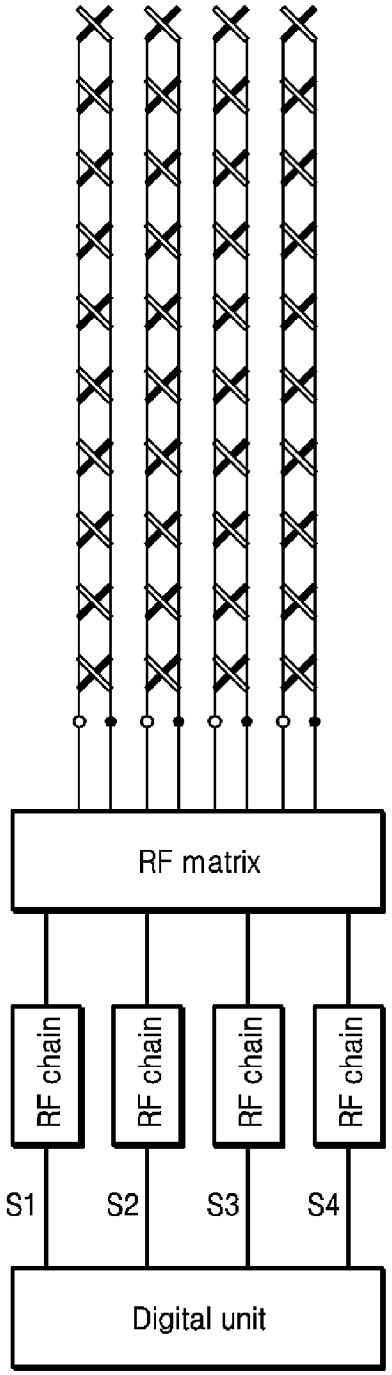
FIG. 2A depicts another example of a 4T4R antenna system using a dual-polarized antenna array.
Figure 2B:
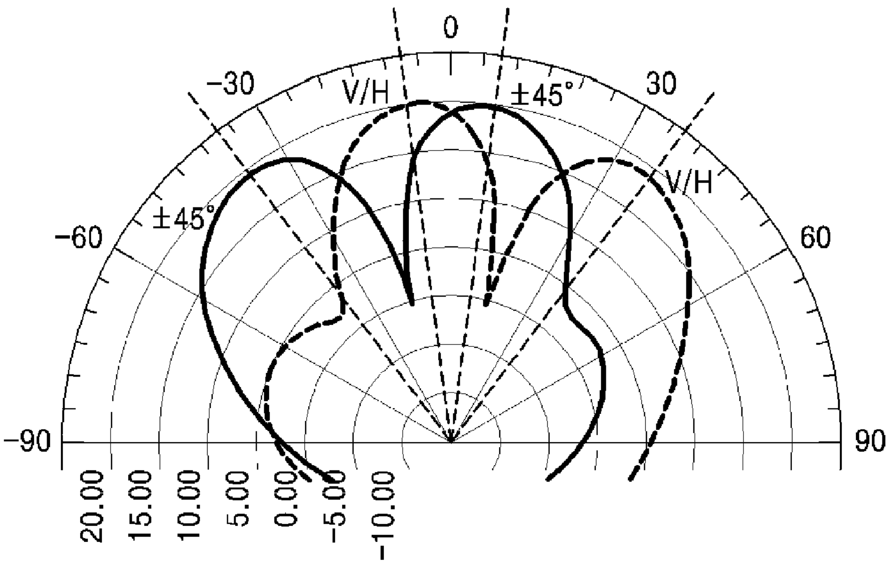
FIG. 2B shows an exemplary spatially multiplexed beam pattern that can be implemented by the antenna system of FIG. 2A.

FIG. 2A depicts another example of a 4T4R antenna system using a dual-polarized antenna array. FIG. 2B shows an exemplary spatially multiplexed beam pattern that can be implemented by the antenna system of FIG. 2A.

The antenna array depicted in FIG. 2A includes four rows of dual-polarized antenna units. Each dual-polarized antenna unit includes a first antenna element having +45° polarization and a second antenna element having −45° polarization. In each row, the antenna elements are connected to respective feeder lines for each of polarizations, thereby forming a first sub-array and a second sub-array. Thus, in the dual-polarized antenna array depicted in FIG. 2A, the antenna elements are divided into eight sub-arrays. The eight sub-arrays are connected to eight antenna ports, respectively, through feeder lines. The eight antenna ports are connected to four RF chains through an RF matrix. Thus, the antenna system of FIG. 2A is 4T4R.

In the antenna system of FIG. 2A, four independent beams (i.e., two beams having +/−45° polarizations and two beams having V/H polarizations) may be formed through polarization reconfiguration of the RF matrix. The RF matrix may be implemented by passive elements such as a hybrid coupler, a directional coupler, and a phase shifter. The functions of the RF matrix may also be implemented by processing baseband signals in the digital domain, as in the case of the antenna system of FIG. 1A.

Referring to FIG. 2B, four beams with a beam width of about 40° with respect to a horizontal surface may be formed in different directions. In particular, contiguous beams have different dual polarization characteristics from each other. For example, beams of +/−45° and beams of 0°/90° are alternately formed or interleaved from the left side.

As explained above, antenna systems using a dual-polarized antenna array are capable of spatially isolating beams with different dual polarization characteristics from each other through signal processing in the digital domain or the RF domain. However, special hardware is required to implement polarization synthesis/separation which is performed in the digital domain, and therefore the antenna system generates more heat. The polarization reconfiguration by the RF matrix involves loss caused by the elements constituting the matrix, and makes it difficult to maintain accurate spacing between beams.

As described previously, the present disclosure presents an antenna array configuration that is useful to achieve spatial polarization separation such that contiguous beams have different dual polarization characteristics from each other.

Figure 3A:
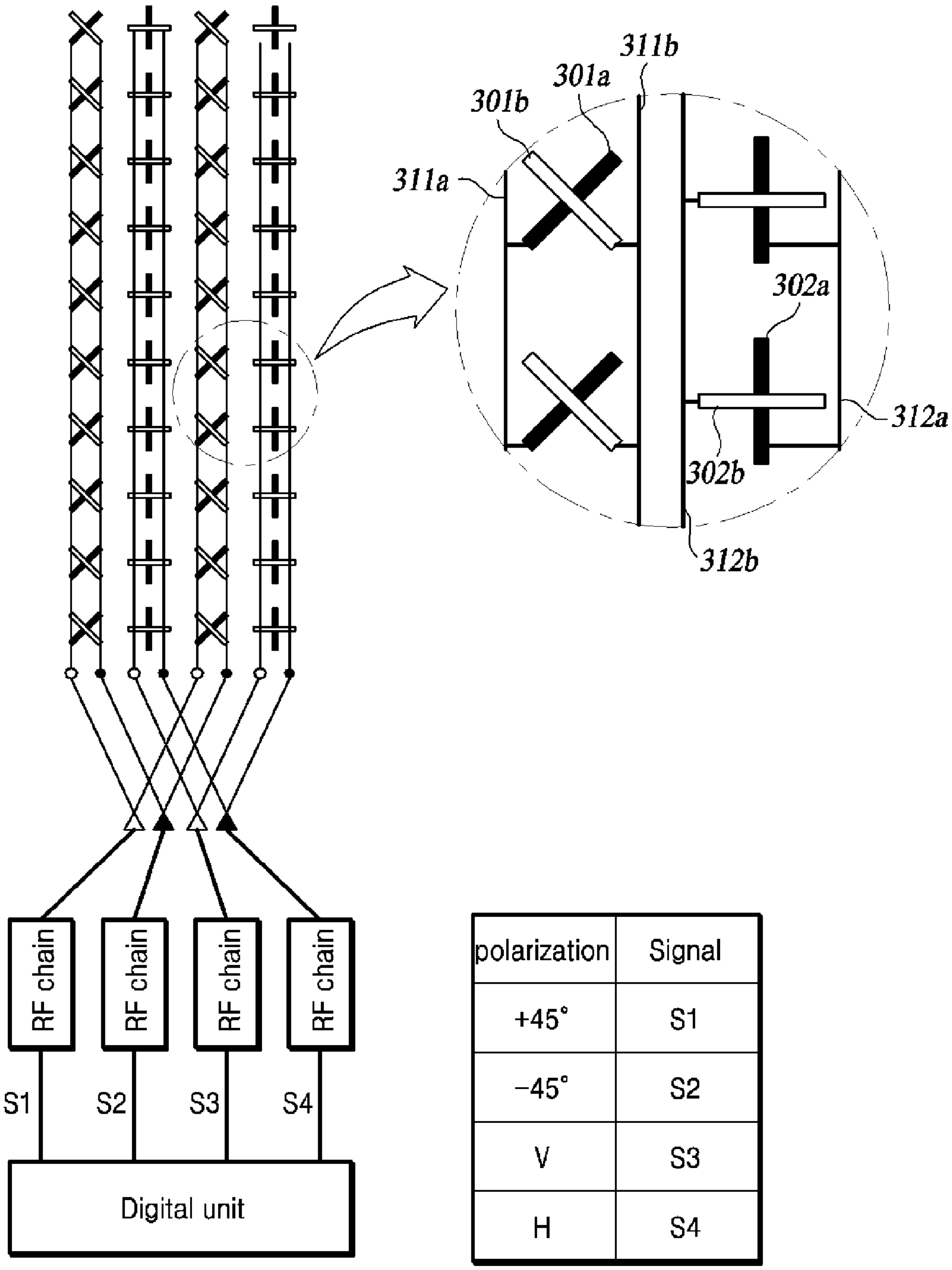
FIG. 3A depicts an example of a 4T4R antenna system using a quad-polarized array according to an aspect of the present disclosure.
Figure 3B:
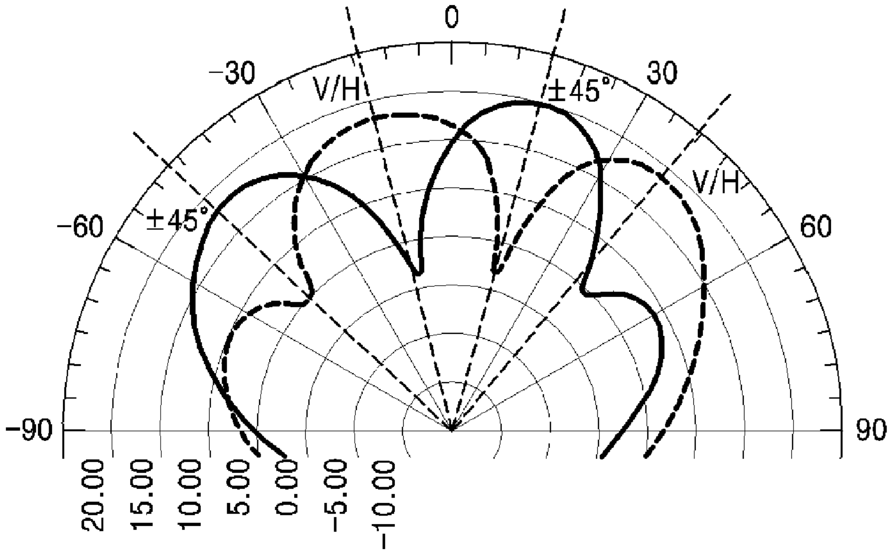
FIG. 3B shows an exemplary spatially multiplexed beam pattern that can be implemented by the antenna system of FIG. 3A.

FIG. 3A depicts an example of a 4T4R antenna system using a quad-polarized array according to an aspect of the present disclosure. FIG. 3B shows an exemplary spatially multiplexed beam pattern that can be implemented by the antenna system of FIG. 3A.

The antenna array depicted in FIG. 3A includes a plurality of first dual-polarized antenna units and a plurality of second dual-polarized antenna units. The first dual-polarized antenna unit and the second dual-polarized antenna unit have different dual polarization characteristics from each other. For example, the first dual-polarized antenna unit include a first antenna element 301*a* having +45° polarization and a second antenna element 301*b* having −45° polarization, and the second dual-polarized antenna unit includes a first antenna element 302*a* having V(90°) polarization and a second antenna element 302*b* having H(0°) polarization. Thus, the antenna array according to the present disclosure may be referred to as a "quad-polarized antenna array".

In the antenna array depicted in FIG. 3A, rows of dual-polarized antenna units of +45°/−45° and rows of dual-polarized antenna units of V/H are alternately arranged or interleaved. That is, dual-polarized antenna units of +45°/−45° and dual-polarized antenna units of V/H are alternately arranged in a horizontal direction, and antenna units having the same dual polarization characteristics are arranged in a vertical direction. In other words, contiguous rows of dual-polarized antenna units have different dual polarization characteristics from each other.

In each row, the antenna elements are connected to respective feeder lines for each of polarizations to form a first sub-array and a second sub-array.

Figure 4A:
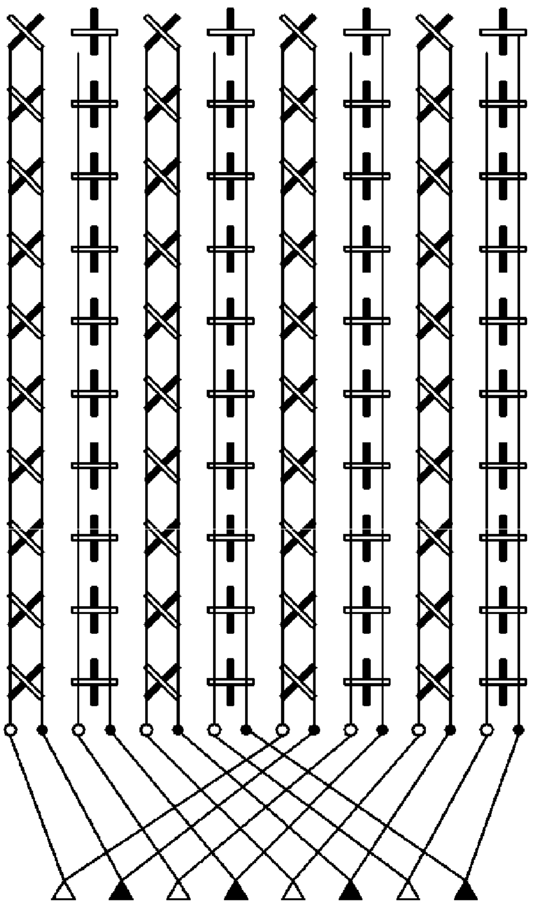
FIG. 4A depicts an example of an 8T8R antenna system using a quad-polarized array according to another aspect of the present disclosure.

Specifically, in rows (i.e., first and third rows) of dual-polarized antenna units of +45°/−45°, the first antenna elements 301*a* having +45° polarization are connected to a first feeder line 311*a* to form a first sub-array, and the second antenna elements 301*b* having −45° polarization are connected to a second feeder line 311*b* to form a second sub-array. In rows of dual-polarized antenna units of V/H (i.e., in second and fourth rows), the first antenna elements 302*a* having V polarization are connected to a first feeder line 312*a* to form a first sub-array, and the second antenna elements 301*b* having H polarization are connected to a second feeder line 312*b* to form a second sub-array. Thus, in the quad-polarized antenna array depicted in FIG. 3A, the antenna elements are divided in eight sub-arrays. The eight sub-arrays are connected to eight antenna ports, respectively, through feeder lines. The eight antenna ports are connected to four RF chains. Thus, the antenna system of FIG. 4A is 4T4R. The number of RF chains is equal to the sum of the number of rows of first dual-polarized antenna units and the number of rows of second dual-polarized antenna units.

To form a beam for each polarization, one RF chain is applied to two sub-arrays having the same polarization which are arranged in alternate rows. The difference in the RF path to the RF chain between two sub-arrays (and the resulting phase difference) can serve to orienting the beam, without a phase shifter.

It is to be noted that the spacing (d) between two sub-arrays having the same polarization is greater than λ as the sub-arrays are arranged in alternate rows. For example, the spacing (d) between two sub-arrays may be from 1.5λ to 2λ. λ is the wavelength of a center frequency in a frequency band for an antenna array. In this arrangement, in addition to a main lobe, which occurs in a desired beam direction, a grating lobe, which is a side lobe comparable in size to the main lobe, occurs in a direction where the phase is a multiple of 2π. A direction in which a grating lobe occur is determined by the spacing (d) between the sub-arrays, the wavelength (λ), and the beam steering angle (θ) to a desired beam direction in which the main lobe occurs.

An antenna system of the present disclosure may utilize grating lobes, that would typically need to be attenuated, to form a beam pattern similar to that of FIG. 2B.

Referring to FIG. 3A, an antenna port, to which the antenna elements having +45° polarization in the first row are connected, and an antenna port, to which the antenna elements having +45° polarization in the third row are connected, are coupled to a first RF chain to form a beam having +45° polarization. An antenna port, to which the antenna elements with −45° polarization in the first row are connected, and an antenna port, to which the antenna elements having −45° polarization are connected, are coupled to a second RF chain to form a beam having −45° polarization. A main lobe of the beam having +45° polarization and a main lobe of the beam having −45° polarization are formed towards a first spatial direction, and a grating lobe of the beam having +45° polarization and a grating lobe of the beam having −45° polarization are formed towards a second spatial direction. Thus, dual polarizations of +45°/−45° exist in each of two spatial directions.

Also, an antenna port, to which the antenna elements having H(0°) polarization in the second row are connected, and an antenna port, to which the antenna elements having H(0°) polarization in the fourth row are connected, are coupled to a third RF chain to form a beam having H(0°)

polarization. An antenna port, to which the antenna elements having V(90°) polarization in the second row are connected, and an antenna port, to which a fourth row of antenna elements having a V(90°) polarization in the fourth row are connected, are coupled to a fourth RF chain to form a beam having V(90°) polarization. A main lobe of the beam having H(0°) polarization and a main lobe of the beam having V(0°) polarization are formed in a third spatial direction, and a grating lobe of the beam having H(0°) polarization and a grating lobe of the beam having V(90°) polarization are formed in a fourth spatial direction. Thus, dual polarizations of H/V exist in each of two spatial directions.

Referring to FIG. 3B, four beams may be formed towards different directions with respect to a horizontal surface. In particular, contiguous beams have different dual polarization characteristics from each other. For example, dual-polarized beams of +/−45° and dual-polarized beams of 0°/90° are alternately formed from the left side. One of the dual-polarized beams of +/−45° is caused by a main lobe, and the other is caused by a grating lobe. Likewise, one of the dual-polarized beams of 0°/90° is caused by a main lobe, and the other is caused by a grating lobe.

The antenna system depicted in FIG. 3A may achieve spatial multiplexing of polarized beams by employing a simple combiner that connects sub-arrays of antenna elements to an RF chain in the RF domain. Since the formation of the spatially multiplexed beam pattern can be achieved with only RF circuitry, no hardware for signal processing is required and the problem of heat generation can be improved, compared to the antenna system depicted in FIG. 1*a*, which signal processing in the digital domain is required for the spatially multiplexed beam pattern. Moreover, compared to the antenna system depicted in FIG. 2A, accurate spacing between beams can be maintained and the overlapping area between beams that affects SINR can be minimized.

Figure 4B:
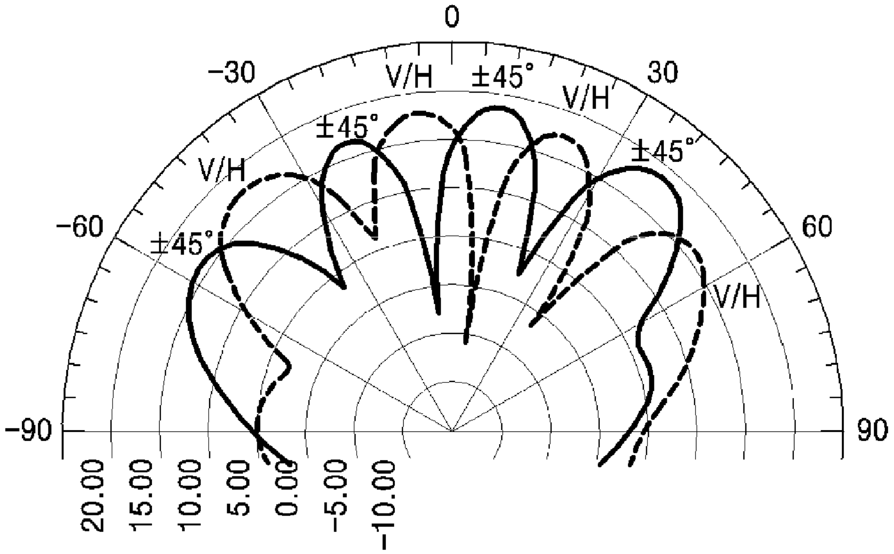
FIG. 4B shows an exemplary spatially multiplexed beam pattern that can be implemented by the antenna system of FIG. 4A.

FIG. 4A depicts an example of an 8T8R antenna system using a quad-polarized array according to another aspect of the present disclosure. FIG. 4B shows an exemplary spatially multiplexed beam pattern that can be implemented by the antenna system of FIG. 4A. The RF chains and the digital unit are omitted in FIG. 4A in order to accentuate the configuration of the antenna array.

The antenna array depicted in FIG. 4A includes four rows of dual-polarized antenna units of +45°/−45° and four rows of dual-polarized antenna units of V/H which are alternately arranged. That is, the antenna units of +45°/−45° and the antenna units of V/H are alternately arranged in a horizontal direction, and the antenna units with the same dual polarization characteristics are arranged in a vertical direction.

In each row, antenna elements are connected to respective feeder lines for each of polarizations to form a first sub-array and a second sub-array. Thus, in the quad-polarized antenna array depicted in FIG. 4A, the antenna elements are divided into sixteen sub-arrays. The sixteen sub-arrays are connected to sixteen antenna ports, respectively, through feeder lines. The sixteen antenna ports are connected to eight RF chains (not shown).

To form a beam for each polarization, one RF chain is applied to two sub-arrays having the same polarization which are arranged in alternate rows. The difference in the RF path to the RF chain between two sub-arrays (and the resulting phase difference) can serve to orienting the beam, without a phase shifter.

To support beam directions of various angles, horizontal spacing between sub-arrays coupled to one RF chain is greater compared to FIG. 3A. For example, an antenna port, to which antenna elements having +45° polarization in a first row are connected, and an antenna port, to which antenna elements having +45° polarization in a fifth row are connected, are coupled to one RF chain to form a beam having +45° polarization. An antenna port, to which antenna elements having H(0°) polarization in a second row are connected, and an antenna port, to which antenna elements having H(0°) polarization in a sixth row are connected, are coupled to one RF chain. Referring to FIG. 4B, eight beams may be formed towards different directions with respect to a horizontal surface, and contiguous beams have different dual polarizations. As mentioned previously, four beams out of the eight beams are caused by a grating lobe.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand that the scope of the claimed invention is not to be limited by the above explicitly described embodiments but by the claims and equivalents thereof

What is claimed is:

1. A quad-polarized antenna system comprising:

a plurality of RF chains; and an antenna array in which rows of first dual-polarized antenna units and rows of second dual-polarized antenna units are alternately arranged in a horizontal direction, wherein each of the first dual-polarized antenna units includes a first antenna element and a second antenna element which are perpendicular to each other, and each of the second dual-polarized antenna units includes a third antenna element and a fourth antenna element which are perpendicular to each other;

wherein each of the first dual-polarized antenna units and each of the second dual-polarized antenna units have different dual polarization characteristics from each other, wherein, in each of the rows of first dual-polarized antenna units, the first antenna elements are connected to a feeder line to form a first sub-array, and the second antenna elements are connected to a feeder line to form a second sub-array, and in each of the rows of second dual-polarized antenna units, the third antenna elements are connected to a feeder line to form a third sub-array, and the fourth antenna elements are connected to a feeder line to form a fourth sub-array, wherein a pair of the first sub-arrays positioned in different rows are connected to a first RF chain, a pair of the second sub-arrays positioned in different rows are connected to a second RF chain, a pair of the third sub-arrays positioned in different rows are connected to a third RF chain, and a pair of the fourth sub-arrays positioned in different rows are connected to a fourth RF chain, wherein directions of the first to fourth beams are defined by differences in RF path lengths from respective sub-arrays to the corresponding RF chains, wherein a spacing between two sub-arrays having the same polarization is greater than a wavelength of a center frequency in a frequency band for the antenna array, wherein the rows of first dual-polarized antenna units are configured to form at least one first beam and at least one second beam which have +/−45° polarizations, and the rows of second dual-polarized antenna units are configured to form at least one third beam and at least one fourth beam which have 0°/90° polarizations, and wherein the first beam, the second beam, the third beam, and the fourth beam are formed towards different spatial directions, and the first and third beams correspond to main lobes, and the second and fourth beams correspond to grating lobes.

2. The quad-polarized antenna system of claim 1, wherein the first beam and the second beam are not spatially contiguous to each other, and the third beam and the fourth beam are not spatially contiguous to each other.

3. The quad-polarized antenna system of claim 1, wherein the first beam and the second beam each are formed contiguous to at least one of the third beam and the fourth beam.

4. The quad-polarized antenna system of claim 1, wherein the antenna elements of each of the first dual-polarized antenna units form an angle of 45 degrees with the third and fourth antenna elements of each of the second dual-polarized antenna units.

5. The quad-polarized antenna system of claim 1, wherein a number of the plurality of RF chains is equal to a sum of a number of the rows of first dual-polarized antenna units and a number of the rows of second dual-polarized antenna units.

* * * * *